Nov. 4, 1969    J. G. BALDWIN ET AL    3,476,902
ELECTRICAL SWITCHES
Filed March 19, 1968
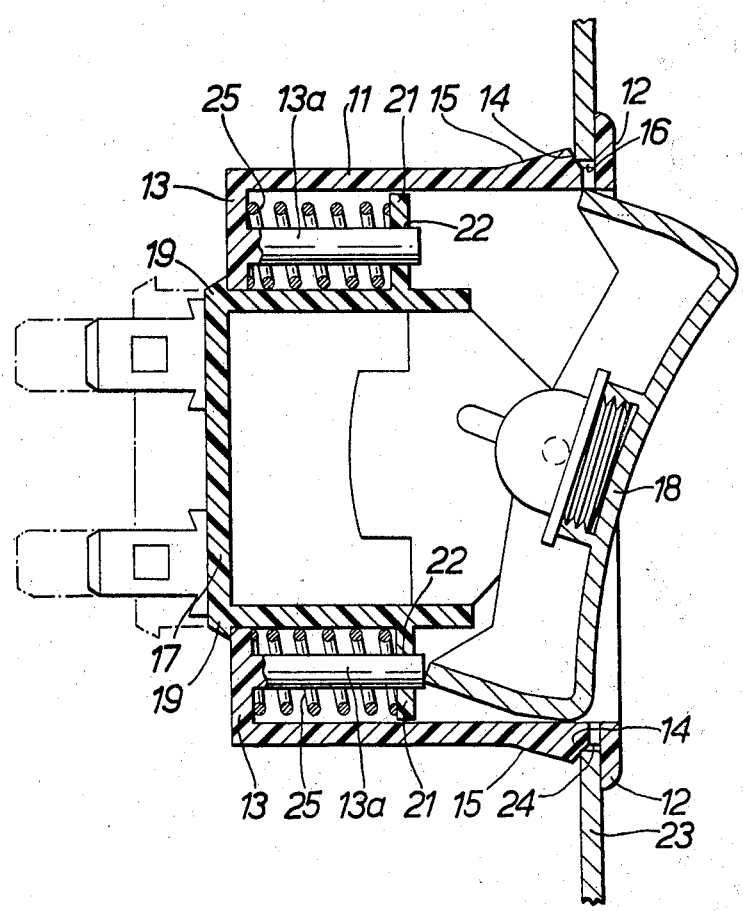

United States Patent Office 3,476,902
Patented Nov. 4, 1969

3,476,902
ELECTRICAL SWITCHES
John Granville Baldwin, Burnley, and William David Holt, Colne, England, assignors to Joseph Lucas (Industries) Limited, Birmingham, England
Filed Mar. 19, 1968, Ser. No. 714,203
Claims priority, application Great Britain, Mar. 31, 1967, 14,732/67
Int. Cl. H01h 9/02
U.S. Cl. 200—168                                                1 Claim

ABSTRACT OF THE DISCLOSURE

In an electrical switch for a road vehicle, a sleeve is secured to the facia panel, and within the sleeve is mounted a body containing the switch mechanism and the operating member of the switch. Resilient means is provided between the body and the sleeve so that the body can move axially in the event of a crash.

---

This invention relates to electrical switches.

An electrical switch according to the invention inludes a sleeve adapted to be secured to the facia panel of a road vehicle so as to extend forwardly of the vehicle from the facia panel, a body housed within the sleeve and carrying the switch mechanism and the operating member of the switch, and resilient means supporting the body within the sleeve so that the body can be moved axially relative to the sleeve against the action of said means from its operating position wherein the operating member projects into the passenger compartment of the road vehicle to a position wherein the operating member is flush with the facia panel, said resilient means being such that there is substantially no movement of the body relative to the sleeve during normal operation of the switch, but the arrangement being such that the body will be moved axially to the position where the operating member is flush with the facia panel when the operating member is struck forcibly, as for example by an occupant of the vehicle in the event of the vehicle crashing.

The accompanying drawing is a sectional view of an electrical switch according to one example of the invention.

Referring to the drawing, the switch includes a sleeve 11 moulded in synthetic resin and having at one end thereof a pair of outwardly directed peripheral flanges 12 and at the other end thereof a pair of inwardly directed flanges 13. Adjacent the flanges 12 are a pair of ribs 14 having respective inclined ramp surfaces 15, the ribs 14 and the flanges 12 defining between them respective grooves 16. The flanges 13 each have integral therewith an axially extending post 13a.

Housed within the sleeve 11 is a moulded synthetic resin body 17 which carries the switch mechanism and pivotally engaged with the body 17 at one end thereof is the operating member 18 of the switch. At its end remote from the member 18 the body is formed with a pair of outwardly extending latch members 19 and between the members 19 and the member 18 the body 17 is formed with a pair of outwardly extending lugs 21 having holes 22 therein.

In order to assemble the switch to a panel 23, for example the facia panel of a road vehicle, the panel 23 is formed with a hole 24. The sleeve 11 is inserted into the hole 24 and is snapped into engagement therewith, the panel 23 engaging in the groove 14 in the sleeve. The body 17 is then inserted into the sleeve 11 from the passenger compartment of the vehicle, the posts 13a of the sleeve 11 extending through the holes 22 in the lug 21 of the body 17. A pair of springs 25 are trapped between the lugs 21 and the flanges 13 and surround the posts 13a the springs 25 urging the body 17 rearwardly out of the sleeve 11. The body 17 is pushed forwardly against the action of the springs 25 until the latch members 19 snap past the flanges 13. When the latch members 19 engage the rear surfaces of the flanges 13, the springs 25 are partially compressed and the operating member 18 projects from the sleeve into the passenger compartment of the vehicle so as to be accessible to an occupant of the vehicle.

The springs 25 exert a force rearwardly on the body 17 greater than the force required to operate the switch, so that when the switch is being operated there will be substantially no relative movement between the body 17 and the sleeve 11. However if the operating member is subjected to a forward force in excess of the force exerted forwardly on the body by the springs 25 as could occur when an occupant of the vehicle is thrown against the facia panel of the vehicle in an accident, then the body 17 and operating member 18 will be moved forwardly against the action of the springs. Thus the risk of injury to an occupant of the vehicle as a result of being thrown against the facia panel is minimised.

It will be appreciated that the body 17 and member 18 will be returned to their original positions by the springs 25, when the forward force is removed.

Having thus described our invention what we claim as new and desire to secure by Letters Patent is:

1. An electrical switch including a sleeve adapted to be secured to the facia panel of a road vehicle so as to extend forwardly of the vehicle from the facia panel, a body housed within the sleeve and carrying the switch mechanism and the operating members of the switch, and resilient means supporting the body within the sleeve so that the body can be moved axially relative to the sleeve against the action of said means from its operating position wherein the operating members projects into the passenger compartment of the road vehicle to a position wherein the operating member is flush with the facia panel, said resilient means being such that there is substantially no movement of the body relative to the sleeve during normal operation of the switch, but the arrangement being such that the body will be moved axially to the position where the operating member is flush with the facia panel when the operating member is struck forcibly as for example by an occupant of the vehicle in the event of the vehicle crashing.

References Cited
UNITED STATES PATENTS

| | | |
|---|---|---|
| 2,767,276 | 10/1956 | Buckanan et al. |
| 2,779,833 | 1/1957 | Farison. |
| 2,803,718 | 8/1957 | Bloom et al. |
| 3,172,983 | 3/1965 | Zoda. |
| 3,305,658 | 2/1967 | Heyhal. |
| 3,337,708 | 8/1967 | Cerveny et al. |
| 3,339,050 | 8/1967 | Mitchell. |

H. O. JONES, Primary Examiner